US011943760B2

(12) United States Patent
Guo et al.

(10) Patent No.: US 11,943,760 B2
(45) Date of Patent: Mar. 26, 2024

(54) DEEP COOPERATIVE FEATURE SHARING AMONG CONNECTED VEHICLES

(71) Applicant: Toyota Motor Engineering & Manufacturing North America, Inc., Plano, TX (US)

(72) Inventors: Rui Guo, San Jose, CA (US); Hongsheng Lu, San Jose, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/382,514

(22) Filed: Jul. 22, 2021

(65) Prior Publication Data

US 2023/0024265 A1   Jan. 26, 2023

(51) Int. Cl.
*H04W 72/1263* (2023.01)
*H04W 4/46* (2018.01)

(52) U.S. Cl.
CPC ......... *H04W 72/1263* (2013.01); *H04W 4/46* (2018.02)

(58) Field of Classification Search
CPC ...... G06N 3/08; G06N 3/0454; G06K 9/6256; G06K 9/6268; G06K 9/629; G06T 2207/20076; G06T 2207/20081; G06T 2207/20084; H04W 92/18; H04W 72/40; H04W 72/1263; H04W 72/02; H04W 4/46

See application file for complete search history.

(56) References Cited

U.S. PATENT DOCUMENTS

| 2021/0082210 A1 | 3/2021 | Sakr et al. |
| 2021/0152996 A1 | 5/2021 | Manivasagam et al. |
| 2021/0389777 A1* | 12/2021 | Cho ............... B60W 10/04 |

FOREIGN PATENT DOCUMENTS

| CN | 103457886 B | 4/2016 |
| CN | 106772516 A | 5/2017 |
| CN | 108961751 A | 12/2018 |
| KR | 102261754 B1 * | 7/2021 |

OTHER PUBLICATIONS

Shunsuke Aoki, et al. 'Cooperative Perception with Deep Reinforcement Learning for Connected Vehicles'. Apr. 23, 2020.

* cited by examiner

*Primary Examiner* — Khalid W Shaheed
(74) *Attorney, Agent, or Firm* — Dinsmore & Shohl LLP (57) ABSTRACT

A method for data sharing between a transmitter vehicle and a receiver vehicle includes obtaining sensor data, encoding the sensor data into structured data having a set of features and a set of channels, generating a channel attention map based on inter-channel relationships of the set of features, generating weights corresponding to channels of the channel attention map, selecting one or more channels among the set of channels based on the weights corresponding to the set of channels, and transmitting the selected channels to the receiver vehicle.

20 Claims, 7 Drawing Sheets

DEEP COOPERATIVE FEATURE SHARING AMONG CONNECTED VEHICLES

TECHNICAL FIELD

The present disclosure relates to connected vehicle systems and, more particularly, to systems and methods for cooperative feature sharing among connected vehicles.

BACKGROUND

Connected vehicle technologies typically rely heavily on automotive sensing because it enables the vehicle to perceive and navigate around its environment. Moreover, connected vehicle technologies typically rely heavily on data exchange with other vehicles because what a single vehicle may perceive may not be as desirable as what a plurality of vehicles can perceive. Although these topics have been discussed theoretically for years, the fundamental and systemic solutions face many difficulties to large-scale deployment due to constraints in the connected vehicle environment such as limited communication bandwidth and increasingly large datasets. To save bandwidth, vehicles may exchange cropped information based on pre-defined, geolocation-based principles. The sensory data that falls into a field of interest may be encoded and transmitted to the destined receivers. However, due to the constraints in the connected vehicle environment, it is still impractical to transmit all the raw sensory data or even the cropped sensory data, which may still contain redundancies.

Therefore, an intelligent strategy for sharing data that can overcome bandwidth and congestion limitations by sending and/or requesting specific sensory features as identified by machine learning is desired.

SUMMARY

In accordance with one embodiment of the present disclosure, a method for data sharing between a transmitter vehicle and a receiver vehicle includes obtaining sensor data, encoding the sensor data into structured data having a set of features and a set of channels, generating a channel attention map based on inter-channel relationships of the set of features, generating weights corresponding to channels of the channel attention map, selecting one or more channels among the set of channels based on the weights corresponding to the set of channels, and transmitting the selected channels to the receiver vehicle.

In accordance with another embodiment of the present disclosure, a method for data sharing between a receiver vehicle and a transmitter vehicle includes obtaining sensor data, encoding sensor data into a set of structured data having a set of features and a set of channels, generating a channel attention map based on inter-channel relationships of the set of features, generating weights corresponding to channels of the channel attention map, selecting one or more channels among the set of channels based on the weights corresponding to the set of channels, and transmitting a request for the selected one or more channels.

In accordance with yet another embodiment of the present disclosure, a system for data sharing between connected vehicles includes a controller configured to obtain sensor data, encode the sensor data into structured data having a set of features and a set of channels, generate a channel attention map based on inter-channel relationships of the set of features, generate weights corresponding to channels of the channel attention map, select one or more channels among the set of channels based on the weights corresponding to the set of channels, and transmit the selected channels to the receiver vehicle.

Although the concepts of the present disclosure are described herein with primary reference to data generated by LIDAR sensors, it is contemplated that the concepts will enjoy applicability to any imaging sensor. For example, and not by way of limitation, it is contemplated that the concepts of the present disclosure can apply to data generated by RADAR sensors.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Connected vehicles may rely on their perception of the environment to make decisions about how they should navigate the environment. To have such perceptions, autonomous vehicles may include a variety of sensors, such as LIDAR sensors or RADAR sensors, to capture digital representations of the environment. A vehicle's perception of its environment may be improved by gathering more perception data from another vehicle, thereby creating a more thorough perception of the vehicle's environment. However, continuously transmitting raw data may consume too much bandwidth for the transmission to be fast enough for the vehicle to processes the data in time.

Figure 1:
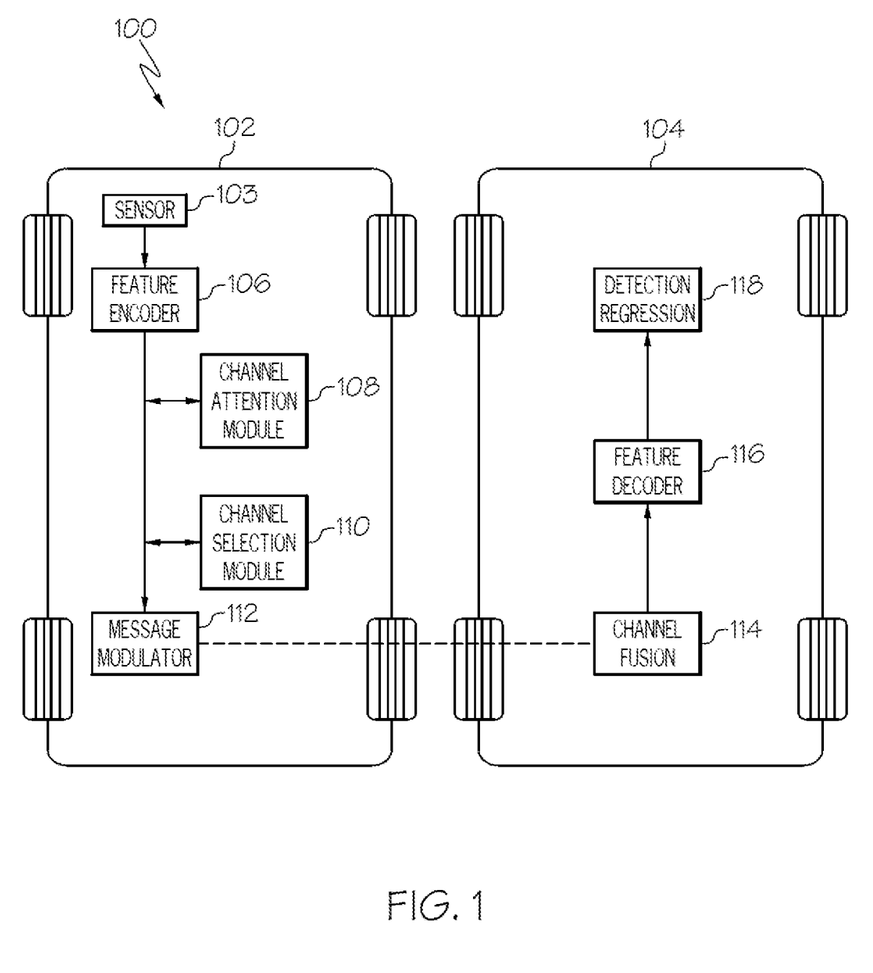
FIG. 1 schematically depicts an example system of deep cooperative feature sharing among connected vehicles, according to one or more embodiments shown and described herein.
Figure 2:
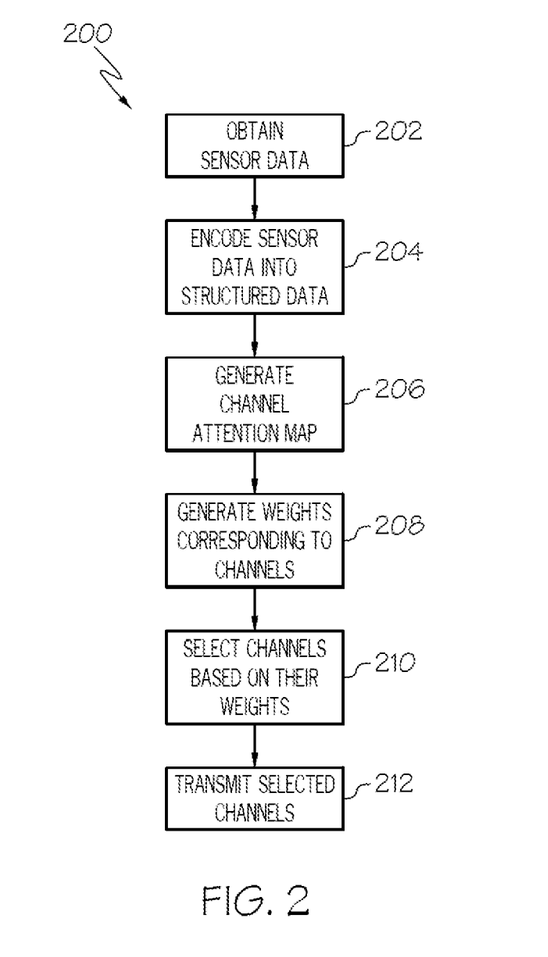
FIG. 2 depicts a flowchart of an example method for data sharing between a transmitter vehicle and a receiver vehicle, according to one or more embodiments shown and described herein.
Figure 3:
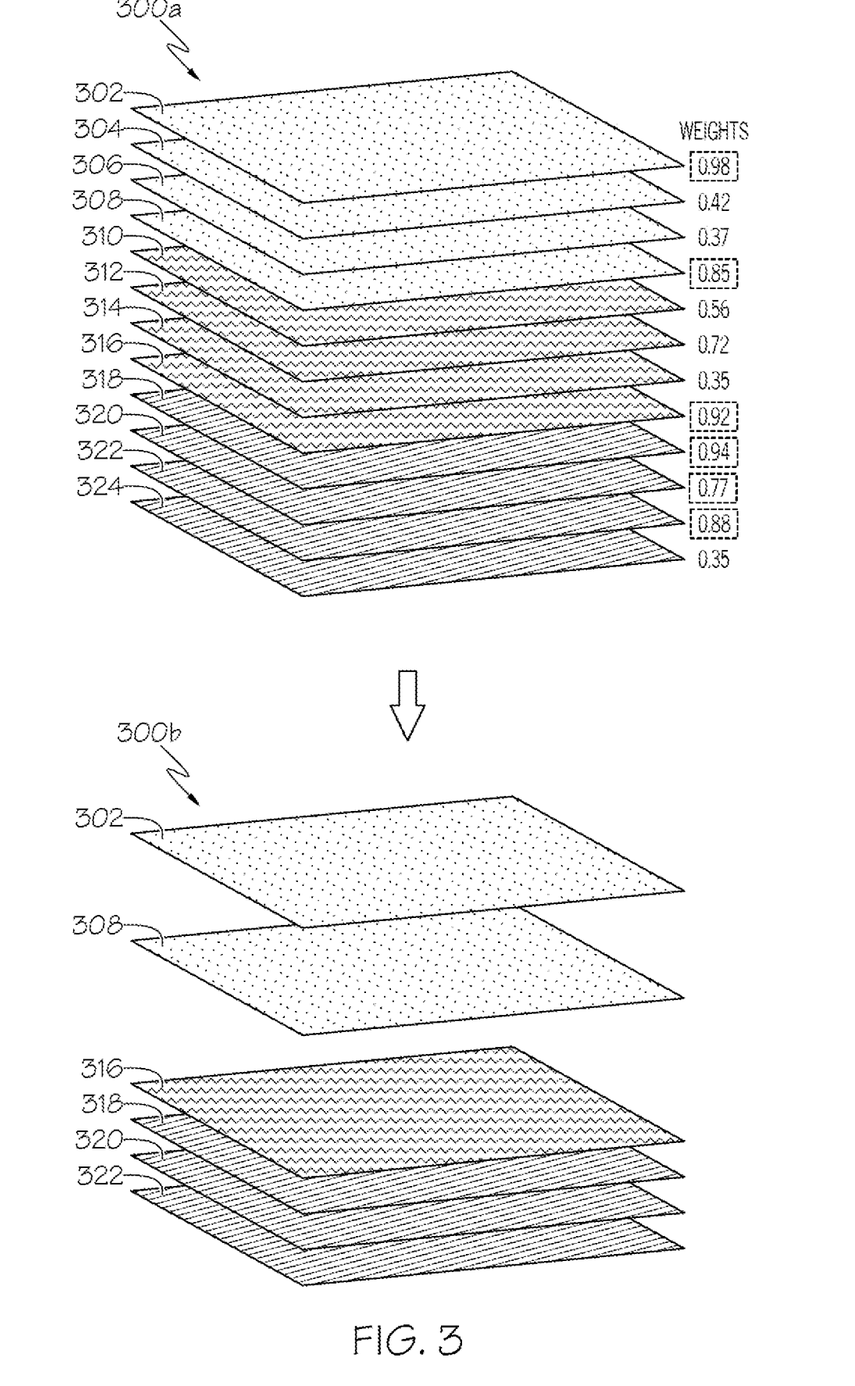
FIG. 3 schematically depicts an example of channel attention and channel selection, according to one or more embodiments shown and described herein.
Figure 4:
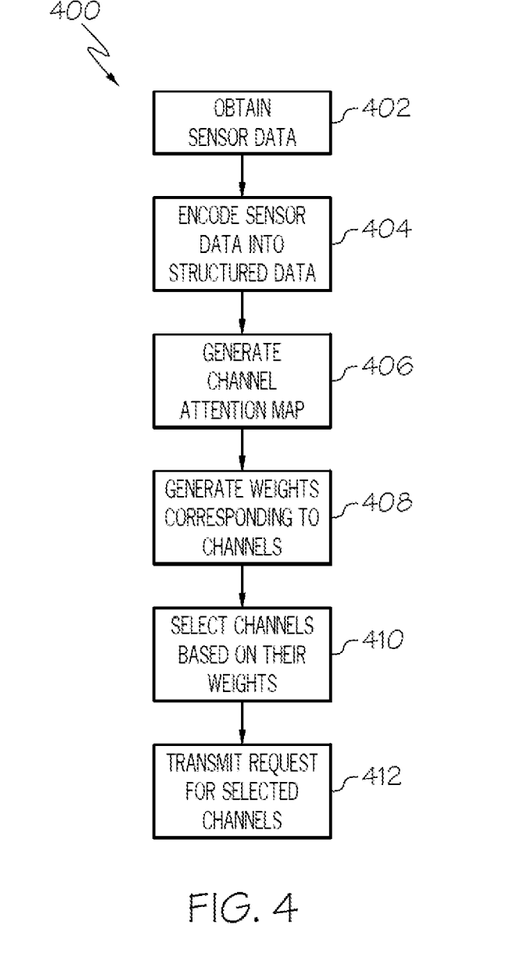
FIG. 4 depicts a flowchart of an example method for data sharing between a receiver vehicle and a transmitter vehicle, according to one or more embodiments shown and described herein.
Figure 5:
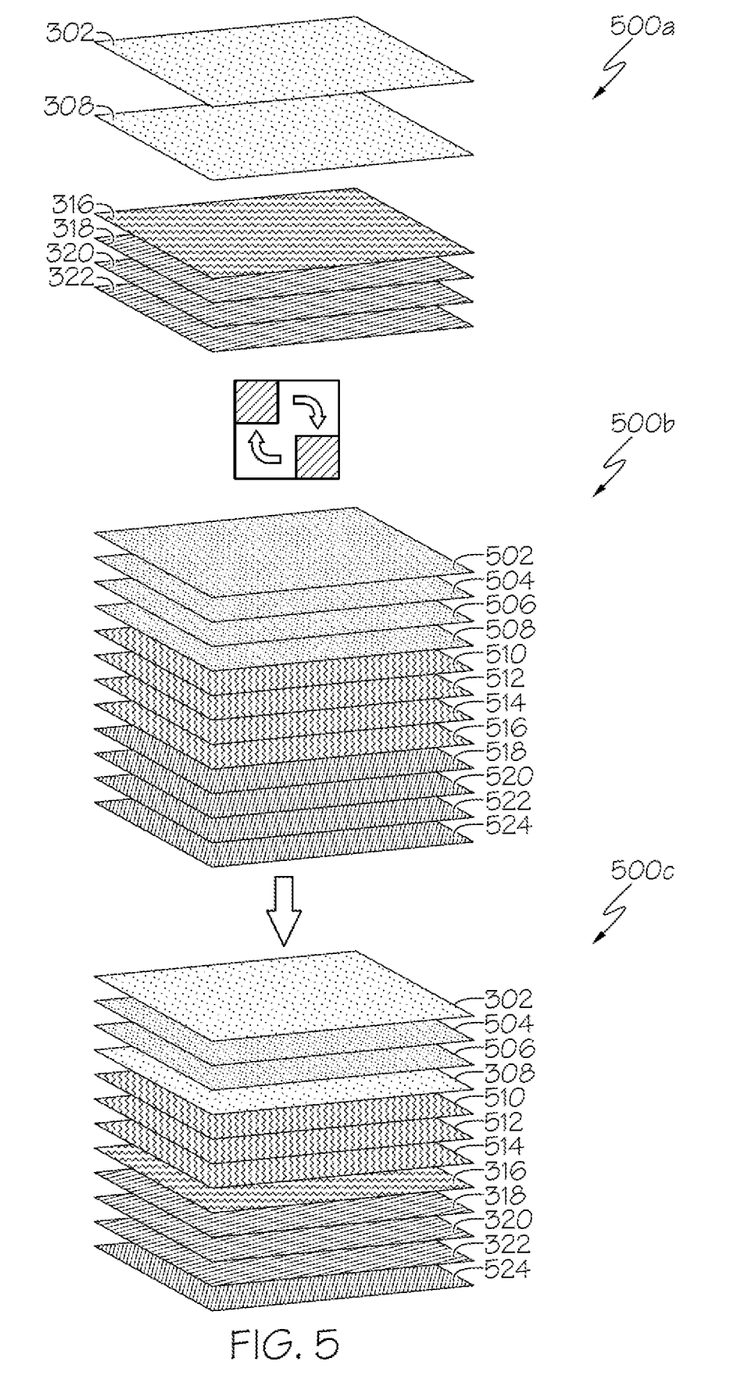
FIG. 5 schematically depicts an example of channel fusion, according to one or more embodiments shown and described herein.
Figure 6:
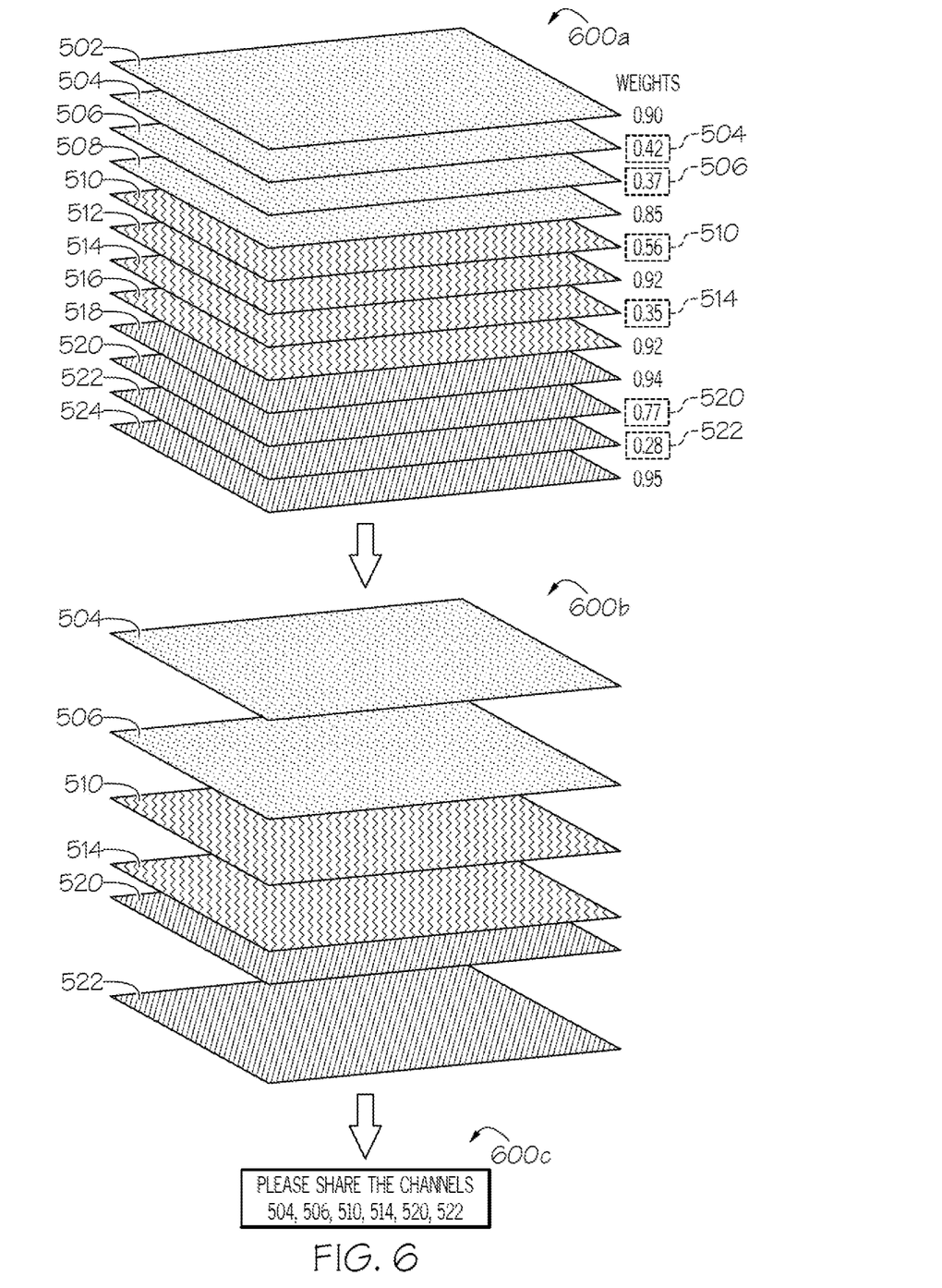
FIG. 6 schematically depicts an example of requesting channel sharing, according to one or more embodiments shown and described herein.

The embodiments of the present disclosure include systems and methods for deep cooperative feature sharing among connected vehicles, as illustrated in FIG. 1. Systems and methods presented herein focus on transmitting encoded perception features in structured data to reduce bandwidth consumption. Unlike information cropping methods based on blind zone analyses and geolocation as described above, systems and methods of the present disclosure focus on information filtering technology. Systems and methods may adaptively select layers (also referred to as "channels" in the deep learning context) that assist in a vehicle's perception of its environment. The channel selection is bi-directional, meaning that channel selection could come from the transmitter vehicle, as shown in FIG. 2, and/or the receiver vehicle, as shown in FIG. 4. When channel selection originates from the transmitter vehicle's side, as shown in FIG. 3, the transmitter vehicle selects the information that among the highest confidence levels to improve the quality of the data for the receiver vehicle, as shown in FIG. 5. When channel selection originates from the receiver vehicle's side, as shown in FIG. 6, the receiver vehicle requests enough information to at least compensate for the receiver vehicle's uncertainty. The uncertainty may be based on a deep neural network associated with an information filter.

Referring now to FIG. 1, an example system 100 of deep cooperative feature sharing among connected vehicles 102, 104 is depicted. Embodiments may be divided into two working modes: a transmitter mode and a receiver mode. For purposes of FIG. 1, the vehicle 102 will be a transmitter vehicle and the vehicle 104 will be a receiver vehicle, although both vehicles may contain the same components to operate in the other mode. It should be understood, however, that a connected vehicle may act as both a transmitter vehicle and a receiver vehicle. For example, although the vehicle 102 is a transmitter vehicle in FIG. 1, the vehicle 102 may simultaneously be a receiver vehicle to a third vehicle not shown in FIG. 1. Similarly, although the vehicle 104 is a receiver vehicle in FIG. 1, the vehicle 104 may simultaneously be a transmitter vehicle to a fourth vehicle not shown in FIG. 1. Each of the connected vehicles 102, 104 may be a vehicle including an automobile or any other passenger or non-passenger vehicle such as, for example, a terrestrial, aquatic, and/or airborne vehicle. In some embodiments, one or more of the connected vehicles 102, 104 may be an unmanned aerial vehicle (UAV), commonly known as a drone. While FIG. 1 depicts communication between connected vehicles, the present disclosure may apply to communication between other entities, between a connected vehicle and a road side unit, between two road side units, between a connected vehicle and a mobile device such as a smartphone, and the like.

Before data is transmitted, a preparatory message may be sent between the vehicles 102, 104. The preparatory message may comprise a position of the vehicle 102, 104, a heading angle of the vehicle 102, 104, intrinsic parameters of the sensor of the vehicle 102, 104, extrinsic parameters of the sensor of the vehicle 102, 104, or other vehicle metadata. The preparatory message may be used to align the data of the collaborative vehicle (i.e., the transmitter vehicle 102) and the ego vehicle (i.e., the receiver vehicle 104). After the data alignment, the transmitter vehicle 102 and the receiver vehicle 104 may work in a pipeline as shown in FIG. 1.

Additionally, before data is encoded, a machine learning model may be trained to engage in channel-based attention. The machine learning model may be a convolutional neural network, multi-layer perception, or the like, capable of image semantic extraction. The machine learning model may be trained to recognize subjects of interest, such as signs, vehicles, pedestrians, and any other subjects of interest in a driving environment. The training may be based on a training dataset comprising subjects of interest, such as signs, vehicles, pedestrians, and any other object in a driving environment. The training dataset and the inputs that the machine learning model analyses may be of the same format, such as images, videos, point clouds, and any other digital representation that may be captured by the sensor of a connected vehicle.

The system 100 is formulated as an encoder-decoder complementary structure. A feature encoder module 106 and a feature decoder module 116 may be deployed onto the transmitter vehicle 102 and the receiver vehicle 104, respectively. As shown in FIG. 1, the feature encoder module 106 may process raw sensor data into structured data. For example, if the sensor 103 is a LIDAR sensor, the structured data may be a layered structure, with each layer corresponding to a channel of the LIDAR data. When engaging in the system 100 to share data with another connected vehicle, the transmitter vehicle 102 may transmit only selected layers to the other vehicle through, for example, vehicle-to-vehicle (V2V) communications. To implement the layered data weighing, a channel attention module 108 is utilized. The channel attention module 108 is a module for channel-based attention in machine learning models, such as a convolutional neural network. The channel attention module 108 may generate a channel attention map by exploiting the inter-channel relationship of features identified by the channel attention module 108. As each channel of a feature map is considered as a feature detector, the channel attention module 108 determines what is meaningful in a given input data, such as a subject of interest in an image or point cloud. Based on the determination of channel attention module 108, the layer may be assigned a weight to reflect the importance of the layer based on the type of features, the importance of the features, the quality of the features, confidence of the feature determination, and/or other data quality metrics.

After assigning a weight to the layers, the transmitter vehicle 102 may select the layers with the highest weights to transmit to the receiver vehicle 104. To implement layered data selection, a channel selection module 110 is utilized. The channel selection module 110 may select one or more channels among the set of channels based on the weights corresponding to each channel in the set of channels. In some embodiments, a threshold may be determined. The threshold may be based on data certainty, network constraints, vehicle processing constraints, and/or other data and/or systems constraints.

The channel selection module 110 selects the best layers in the feature map to send to the receiver vehicle 104 to provide a potentially higher quality replacement for similar data in the feature map of the receiver vehicle 104. The selected channels are passed to the message modulator 112 of the transmitter vehicle 102 for transmission to the receiver vehicle 104. The message modulator 112 may process and package the selected channels for transmission to the receiver vehicle 104.

Once the data from the transmitter vehicle 102 is received by the receiver vehicle 104, the receiver vehicle 104 continues the collaborative data sharing by fusing the received channels with the original feature channels of the receiver vehicle 104, as shown in FIG. 5. The received channels are passed to the channel fusion module 114 of the receiver vehicle 104. The channel fusion module 114 may process and unpack the channels to prepare the data for processing by the remaining modules for deep collaborative feature sharing. Once the channels shared from the transmitter vehicle 102 are received and/or processed, the shared channels may replace the corresponding channels in the feature channels of the receiver vehicle 104. In some embodiments, the shared channels may only replace the corresponding channels in the feature channels of the receiver vehicle 104 when the shared channels are an improvement over the corresponding channels. For example, when the shared channels have a higher weight than the corresponding channels in the receiver vehicle 104, the shared channels may replace the corresponding channels, assuming the channels are weighed by the same process in the vehicles' collaboration process. In some embodiments, the feature decoder module 116 may utilize the preparatory message from the transmitter vehicle 102 to modify the channels shared from the transmitter vehicle 102 such that it is normalized according to the channels of the receiver vehicle 104.

Additionally or alternatively, the receiver vehicle 104 may also request certain channels from the transmitter vehicle 102 according to the feature map of the receiver vehicle 104 to further the collaboration between the vehicles 102, 104. The indices of layers with low weights values, which may represent large degrees of uncertainty, may be requested to be shared from the transmitter vehicle 102. Requesting the channels that are uncertain to the receiver vehicle 104 may increase the certainty of the observations of the receiver vehicle 104 after the requested channels have been fused into the channels of the receiver vehicle 104. Requesting channels from the transmitter vehicle 102 may occur before and/or after fusion of the shared channels of the transmitter vehicle 102 into the channels of the receiver vehicle 104. The feature decoder module 116 of the receiver vehicle 104 may decode the structured data to sensor data that is enhanced by the highly weighed channels shared from the transmitter vehicle 102. As a result, sensing by the receiver vehicle 104 may be enhanced to implement an improved perception task by the detection regression module 118, such as subject detection, bounding box object localization, and/or other data processing techniques.

Referring now to FIG. 2, a flowchart of an example method 200 for data sharing from a transmitter vehicle perspective is depicted. Discussion of FIG. 2 will be made with reference to FIG. 1. The transmitter vehicle may be the transmitter vehicle 102 from FIG. 1, having the feature encoder module 106, the channel attention module 108, the channel selection module 110, and the message modulator 112. The receiver vehicle may be the receiver vehicle 104 from FIG. 1, having the channel fusion module 114, the feature decoder module 116, and the detection regression module 118.

The process begins at block 202 where the transmitter vehicle 102 obtains sensor data. The transmitter vehicle 102 may contain sensors 103 for gathering data about the vehicle's environment, such as LIDAR sensors, RADAR sensors, imaging sensors, and other object detection sensors. The present disclosure will utilize LIDAR sensors for purposes of discussion, though it should be understood that such discussion is exemplary and non-limiting. The LIDAR sensors may gather 3D point cloud data that may be then be obtained by a processor of the vehicle. The process may then move to block 204.

At block 204, the sensor data may be encoded into structured data. The feature encoder module 106 may take raw sensor data as input and output structured data having a plurality of discrete units and a plurality of features. For example, the feature encoder module 106 may process a 3D point cloud generated by a LIDAR sensor of the transmitter vehicle 102 into a layered structure, the discrete units being the layers.

At block 206, a channel attention map may be generated. The channel attention map may be generated by the channel attention module 108 of the transmitter vehicle 102. The channel attention module 108 is a module for channel-based attention in machine learning, particularly convolution neural networks. The channel attention module 108 may contain a machine learning model to generate a channel attention map by exploiting the inter-channel relationship of features, where layers of the structured data may be represented as channels. Each channel of the feature map is a feature detector, focusing on what is meaningful in a given input data set, as opposed to where the meaningful data is located. What is meaningful may vary in importance, and the importance of the layer based on what is determined to be meaningful may be represented as a weight value. To determine what subjects should be identified, the machine learning model of the channel attention module 108 may be trained to recognize subjects of interest based on training datasets comprising sets of digital representations of subjects of interest.

At block 208, weights corresponding to channels may be generated. In generating the channel attention map, the layered feature maps may be weighed by the channel attention module 108. To determine how subjects should be weighed, the machine learning model of the channel attention module 108 may be trained to weigh subjects of interest based on training datasets comprising sets of digital representations of subjects of interest as well as their corresponding weights. The output of the channel attention module 108 is a weighted list associated with layered data.

At block 210, channels may be selected to be shared with the receiver vehicle 104. The channel selection module 110 of the transmitter vehicle 102 may select the channels of the data to share based on the weights calculated from the channel attention module 108. For example, the channel selection module 110 may generate a threshold for selecting channels. The threshold may be based on factors such as type of subjects identified, degree of certainty of subject identification, available bandwidth, number of channels, and/or any other metrics for selecting channels. In some embodiment, the threshold may be received from a vehicle that requested channels.

At block 212, the selected channels may be shared with the receiver vehicle 104. The threshold calculated at block 210 may be used to filter out channels that have weights that are below the threshold. Channels that have weights that meet the threshold may be transmitted to the receiver vehicle 104. The selected channels are passed to the message modulator 112 of the transmitter vehicle 102 for transmission to the receiver vehicle 104. The message modulator 112 may process and package the selected channels for transmission to the receiver vehicle 104. The processing and packaging may include compression, conversion, segmentation, packetization, and/or any other processing to prepare the data for transmission by a computer network such as a V2V network as described below in FIG. 7. In some embodiments, the message modulator 112 may receive a preparatory message from the receiver vehicle 104 to adjust the selected channels such that the selected channels are normalized based on the receiver vehicle 104. For example, a perspective of the data may be adjusted to compensate for the positioning of the receiver vehicle 104 to make the channels more easily fuse into the channels of the receiver vehicle 104.

Referring now to FIG. 3, an example of channel attention and channel selection is depicted. Discussion of FIG. 3 will be made with reference to FIGS. 1 and 2. After the transmitter vehicle 102 has obtained sensor data in block 202 and encoded sensor data into structured data in block 204, a channel attention map 300a is generated in block 206 by channel attention module 108. The channel attention map 300a may be visualized as a set of channels 302-324. Each channel 302-324 may have a corresponding weight as assigned in block 208. For example, the channel 302 is 0.98, the channel 304 is 0.42, the channel 306 is 0.37, the channel 308 is 0.85, the channel 310 is 0.56, the channel 312 is 0.72, the channel 314 is 0.35, the channel 316 is 0.92, the channel 318 is 0.94, the channel 320 is 0.77, the channel 322 is 0.88, and the channel 324 is 0.35. After the channel attention map 300a is generated in block 206 and weights have been assigned in block 208, channels may be selected based on their weights at block 210. For example, a threshold may be determined to be 0.75. Based on the threshold, selected channels 300b consisting of channel 302, 308, 316, 318, 320, 322 may be selected because their weights are above the threshold, and thus they are likely to be an improvement in the corresponding channels of a cooperative vehicle.

Referring now to FIG. 4, a flowchart of an example method 400 for data sharing from a receiver vehicle is depicted. Discussion of FIG. 4 will be made with reference to FIG. 1. The transmitter vehicle may be the transmitter vehicle 102 from FIG. 1, having the feature encoder module 106, the channel attention module 108, the channel selection module 110, and the message modulator 112. The receiver vehicle may be the receiver vehicle 104 from FIG. 1, having the channel fusion module 114, the feature decoder module 116, and the detection regression module 118.

Like the transmitter vehicle 102, the receiver vehicle 104 may also conduct channel attention calculation and weigh its own layered data. Accordingly, the receiver vehicle 104 may obtain sensor data at block 402 similar to block 204, encode sensor data into structured data at block 404 similar to block 204, generate a channel attention map at block 406 similar to block 206, and generate weights corresponding to channels at block 408 similar to block 208. The feature decoder module 116 of the receiver vehicle 104 may decode the structured data to sensor data that is enhanced by the highly weighed channels shared from the transmitter vehicle 102. As a result, sensing by the receiver vehicle 104 may be enhanced to implement an improved perception task by the detection regression module 118, such as subject detection, bounding box object localization, and/or other data processing techniques. When weights are generated at block 408, weights may be based on the data gathered by the sensors of receiver vehicle 104 and/or the data fused with the data from the transmitter vehicle 102.

At block 410, channels may be selected to be requested from the transmitter vehicle 102. The receiver vehicle 104 may request the channels from the transmitter vehicle 102 according to the weights of the channels in the receiver vehicle 104. The receiver vehicle 104 may request channels that have low weight values according to the weights that it had generated in block 408. This low weight value may be representative of a large degree of uncertainty, and requesting replacements for such data may increase the certainty of the data if the transmitter vehicle 102 has higher weights from the same channels. The receiver vehicle 104 may generate a threshold for selecting channels. The threshold may be based on factors such as type of subjects identified, degree of certainty of subject identification, available bandwidth, number of channels, and/or any other metrics for selecting channels.

At block 412, a request for selected channels may be transmitted to the transmitter vehicle 102. The threshold calculated at block 410 may be used to filter out channels that have weights that are above the threshold. Channels that have weights that are below the threshold may be requested from the transmitter vehicle 102. The transmitter vehicle 102 may receive the request, with or without a preparatory message, and share the requested channels with the receiver vehicle 104 in a manner similar to block 212.

Referring now to FIG. 5, an example of channel fusion is depicted. Discussion of FIG. 5 will be made with reference to FIGS. 1 and 3. The goal of channel fusion is to improve the perception data of the receiver vehicle 104 by inserting better data shared from the transmitter vehicle 102 into the data of the receiver vehicle 104. After the transmitter vehicle 102 has selected channels 300b, the transmitter vehicle 102 may share the selected channels 300b with the receiver vehicle 104. Receiver vehicle 104 may receive the transmission of selected channels 500a. Selected channels 500a comprise channels 302, 308, 316, 318, 320, 322. The received channels 500a are passed to the channel fusion module 114 of the receiver vehicle 104. The channel fusion module 114 may process and unpack the channels 500a to prepare the data for processing by the remaining modules for deep collaborative feature sharing. Processing and unpacking may include decompression, conversion, consolidation, and/or any other processing to prepare the data for processing by the receiver vehicle 104.

The selected channels 500a may be compared the channels 500b of the receiver vehicle 104. In some embodiments, the selected channels 500a may replace the corresponding channels of channels 500b. For example, in FIG. 5, the channels 500b of receiver vehicle 104 examined to replace channels of the channels 500b with the selected channels 500a from the transmitter vehicle 102 by channel fusion to arrive at fused channels 500c. In other embodiments, the selected channels 500a may replace the corresponding channels of channels 500b if the weights of the selected channels 500a are greater than the weights of the corresponding channels in channels 500b. For example, if the channel 302 has a weight of 0.98, then the channel 302 will only replace the channel 502 (i.e., the corresponding channel in channels 500b) if the channel 502 has a weight less than that of the channel 302.

Referring now to FIG. 6, an example of requesting channels from a transmitter vehicle by a receiver vehicle. Discussion of FIG. 6 will be made with reference to FIGS. 1 and 4. The goal of requesting channels is to improve the perception data of the receiver vehicle 104 by replacing low quality data from the receiver vehicle 104 with better data shared from the transmitter vehicle 102. After the receiver vehicle 104 has obtained sensor data in block 402 and encoded sensor data into structured data in block 404, a channel attention map 600a is generated in block 406. The channel attention map 600a may be visualized as a set of channels 502-524. Each channel 502-524 may have a corresponding weight as assigned in block 408. For example, the channel 502 is 0.90, the channel 504 is 0.42, the channel 506 is 0.37, the channel 508 is 0.85, the channel 510 is 0.56, the channel 512 is 0.92, the channel 514 is 0.35, the channel 516 is 0.92, the channel 518 is 0.94, the channel 520 is 0.77, the channel 522 is 0.28, and the channel 524 is 0.95. After the channel attention map 600a is generated in block 406 and weights have been assigned in block 408, channels may be requested based on their weights at block 410. For example, a threshold may be determined to be 0.8. Based on the threshold, channels to be requested 600b consisting of channels 504, 506, 510, 514, 520, 522 may be selected because their weights are below the threshold, and thus they are likely to be better candidates for replacement with data from corresponding channels of a cooperative vehicle. After determining which channels to request, the receiver vehicle 104 may generate a channel request 600c including the channels to be requested 600b for transmission to the transmitter vehicle 102. The message may be of any format and be delivered to the transmitter vehicle 102 by any means, including means other than which channels are shared between the transmitter vehicle 102 and the receiver vehicle 104.

Figure 7:
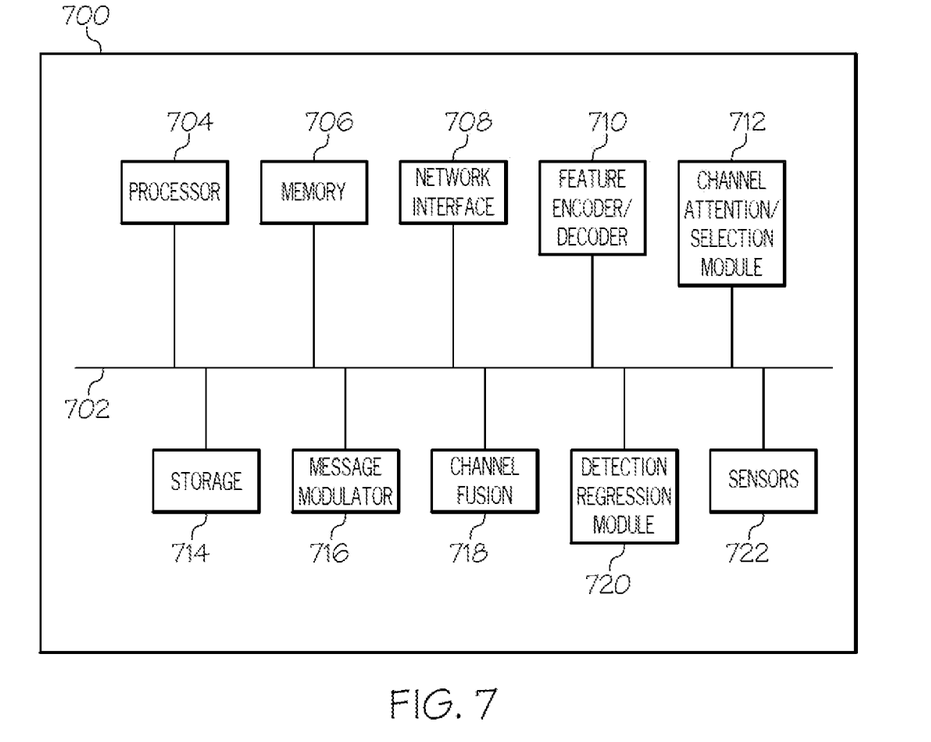
FIG. 7 schematically depicts an example connected vehicle system for deep cooperative feature sharing, according to one or more embodiments shown and described herein.

Referring now to FIG. 7, an example system for deep cooperative feature sharing comprising a connected vehicle 700 is depicted. The connected vehicle 700 may include a processor module 704, a memory module 706, a data storage 714, a sensor module 722, a network interface module 708, a feature encoder/decoder module 710, a channel attention/selection module 712, a message modulator 716, a channel fusion module 718, and a detection regression module 720. The connected vehicle 700 may also include a communication path 702 that communicatively couples the various components of the connected vehicle 700.

The processor module 704 may include one or more processors that may be any device capable of executing machine-readable and executable instructions. Accordingly, each of the one or more processors of the processor module 704 may be a controller, an integrated circuit, a microchip, or any other computing device. The processor module 704 is coupled to the communication path 702 that provides signal connectivity between the various components of the connected vehicle. Accordingly, the communication path 702 may communicatively couple any number of processors of the processor module 704 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 702 may be formed from any medium that is capable of transmitting a signal such as, e.g., conductive wires, conductive traces, optical waveguides, and the like. In some embodiments, the communication path 702 may facilitate the transmission of wireless signals, such as Wi-Fi, Bluetooth. Near-Field Communication (NFC), and the like. Moreover, the communication path 702 may be formed from a combination of mediums capable of transmitting signals. In one embodiment, the communication path 702 comprises a combination of conductive traces, conductive wires, connectors, and buses that cooperate to permit the transmission of electrical data signals to components such as processors, memories, sensors, input devices, output devices, and communication devices. Accordingly, the communication path 702 may comprise a vehicle bus, such as, e.g., a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory module 706 is coupled to the communication path 702 and may contain one or more memory modules comprising RAM, ROM, flash memories, hard drives, or any device capable of storing machine-readable and executable instructions such that the machine-readable and executable instructions can be accessed by the processor module 704. The machine-readable and executable instructions may comprise logic or algorithms written in any programming language of any generation (e.g., 1GL, 2GL, 3GL, 4GL, or 5GL) such as, e.g., machine language, that may be directly executed by the processor module 704, or assembly language, object-oriented languages, scripting languages, microcode, and the like, that may be compiled or assembled into machine-readable and executable instructions and stored on the memory module 706 for execution by the processor module 704. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any computer programming language, as pre-programmed hardware elements, or as a combination of hardware and software components. In some embodiments, the memory module 706 includes machine-readable and executable instructions can configure the processor module 704 to operate as the feature encoder/decoder module 710, channel attention/selection module 712, channel fusion module 718, and/or detection regression module 720.

The sensor module 722 is coupled to the communication path 702 and communicatively coupled to the processor module 704. The sensor module 722 may include LIDAR sensors, RADAR sensors, optical sensors (e.g., cameras), laser sensors, proximity sensors, location sensors, and the like. In embodiments, the sensor module 722 may capture digital representations of the environment of the connected vehicle 700. The digital representations may be photos and/or videos of the environment of the connected vehicle 700 or other digital representations of the environment of the connected vehicle 700 (e.g., 3D point clouds as captured by LIDAR).

The network interface module 708 includes network connectivity hardware for communicatively coupling the connected vehicle 700 to other network-connected devices. The network interface module 708 can be communicatively coupled to the communication path 702 and can be any device capable of transmitting and/or receiving data via a network or other communication mechanisms. Accordingly, the network interface module 708 can include a communication transceiver for sending and/or receiving any wired or wireless communication. For example, the network connectivity hardware of the network interface module 708 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices. The connected vehicle 700 may connect with one or more other connected vehicles and/or external processing devices via a direct or indirect connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time- and/or location-based. In embodiments, a connection between vehicles or between a vehicle and an infrastructure may utilize one or more networks to connect which may be in place of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peerto-peer networks with other vehicles or utilizing centralized networks that rely upon certain vehicles and/or infrastructure. Still, other examples include networks using centralized servers and other central computing devices to store and/or relay information between vehicles. The network interface module 708 may also include the message modulator 716. The message modulator 716 is configured to at least share channels from the feature map between connected vehicles. In some embodiments, the message modulator 716 may send and receive preparatory messages to modulate the channels to be shared for better integration with the data of the cooperative vehicle. For example, the message modulator 716 of a transmitter vehicle may modulate the channels of the structured data to compensate for the difference in position of the receiver vehicle so that the shared channels may be more easily fused with the channels of the receiver vehicle.

The data storage 714 is coupled to the communication path 702 and may contain one or more memory modules comprising flash memories, solid state drives, hard drives, or any device capable of persistent data storage. The data storage 714 may store machine-readable and executable instructions. The data storage 714 may be included as part of the memory module 706. The data storage 714 may store data used by various components and applications of the connected vehicle 700. For example, the data storage 714 may store the generate channel maps when the connected vehicle 700 is in transmitter mode and/or receiver mode. In addition, the data storage 714 may store data gathered by the sensor module 722 and/or received from other vehicles. For example, the data storage 714 may store 3D point clouds and structured data generated therefrom.

The feature encoder/decoder module 710 is coupled to the communication path 702 and may process raw sensor data into structured data. For example, if the sensor is a LIDAR sensor, the structured data may be a layered structure, with each layer corresponding to a channel of the LIDAR data. In some embodiments, the feature encoder/decoder module 710 may exist as machine-readable instructions that may configure the processor module 704 to operate as a feature encoder/decoder module 710.

The channel attention/selection module 712 is coupled to the communication path 702 and is used to weigh and select channels in structured data generated by the feature encoder/decoder module 710. A channel attention/selection module 712 is a module for channel-based attention in machine learning models, such as a convolutional neural network. The channel attention/selection module 712 determines what is meaningful in a given input data, such as a subject of interest in an image or point cloud. Based on the determination of channel attention/selection module 712, the layer may be assigned a weight to reflect the importance of the channel based on the type of features, the importance of the features, the quality of the features, certainty of the feature determination, and/or other data quality metrics. After assigning a weight to the channels, the channel attention/selection module 712 may select the channels based on their weights to transmit to a cooperative vehicle via the network interface module 708. In some embodiments, the channel attention/selection module 712 may exist as machine-readable instructions that may configure the processor module 704 to operate as a channel attention/selection module 712.

The channel fusion module 718 is coupled to the communication path 702 and is used to fuse the shared channels from another vehicle to the channels of the vehicle 700. The shared channels are passed to the channel fusion module 718 of the vehicle 700. The channel fusion module 718 may process and unpack the channels to prepare the data for processing by the remaining modules for deep collaborative feature sharing. Once the channels shared from the other vehicle are received and/or processed by the vehicle 700, the shared channels may replace the corresponding channels in the vehicle 700. In some embodiments, the channel fusion module 718 may exist as machine-readable instructions that may configure the processor module 704 to operate as a channel fusion module 718.

The detection regression module 720 is coupled to the communication path 702 and is used to detect objects in the sensor data. The feature encoder/decoder module 710 of the cooperative vehicle may decode the structured data to sensor data that is enhanced by the received shared channels. As a result, sensing by the vehicle 700 may be enhanced to implement an improved perception task by the detection regression module 720, such as subject detection, bounding box object localization, and/or other data processing techniques. In some embodiments, the detection regression module 720 may exist as machine-readable instructions that may configure the processor module 704 to operate as a detection regression module 720.

It should now be understood that the present disclosure is directed to systems and methods for deep cooperative feature sharing among connected vehicles. A system may have a transmitter mode and a receiver mode to collaborate with another vehicle that also has a transmitter mode and a receiver mode. In a transmitter mode, a transmitter vehicle may obtain sensor data and encode the raw sensor data into structured data having a set of features and a set of channels. The transmitter vehicle may use the structured data to generate a channel attention map with a corresponding set of weights, based on a pre-trained machine learning model and the inter-channel relationships of the set of features. The transmitter vehicle may also select one or more channels among the set of channels based on the weights of the channels and transmit the selected channels to the receiver vehicle that is acting in collaboration with the transmitter vehicle.

In a receiver mode, a receiver vehicle may obtain sensor data and encode the raw sensor data into structured data having a set of features and a set of channels. The receiver vehicle may use the structured data to generate a channel attention map with a corresponding set of weights, based on a pre-trained machine learning model and the inter-channel relationships of the set of features. The receiver vehicle may also select one or more channels among the set of channels based on the weights of the channels and transmit a request for the selected channels. In response to the request, the receiver vehicle may also receive a set of requested channels from the transmitter vehicle that is acting in collaboration with the receiver vehicle.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method for data sharing between a transmitter vehicle and a receiver vehicle comprising:
   obtaining sensor data captured by the transmitter vehicle;
   encoding the sensor data into structured data having a set of features and a set of channels;
   generating a channel attention map based on inter-channel relationships of the set of features;
   generating weights corresponding to channels of the channel attention map;
   selecting one or more channels among the set of channels based on the weights corresponding to the set of channels; and
   transmitting the selected channels from the transmitter vehicle to the receiver vehicle.

2. The method of claim 1, wherein generating the channel attention map is performed by a machine learning model.

3. The method of claim 2, further comprising, before generating the channel attention map, training the machine learning model to recognize subjects of interest based on a training dataset comprising a set of digital representations of subjects of interest.

4. The method of claim 1, further comprising transmitting a preparatory message to the receiver vehicle to assist the receiver vehicle in receiving the selected channels.

5. The method of claim 4, wherein the preparatory message comprises a position of the transmitter vehicle, a heading angle of the transmitter vehicle, intrinsic parameters of a sensor of the transmitter vehicle, extrinsic parameters of the sensor of the transmitter vehicle, or combinations thereof.

6. The method of claim 1, further comprising receiving a request from the receiver vehicle for one or more channels among the set of channels.

7. The method of claim 6, further comprising transmitting the requested channels to the receiver vehicle.

8. The method of claim 1, wherein selecting the one or more channels among the set of channels based on the weights corresponding to channels comprises:
   comparing the weights corresponding to the set of channels with a threshold; and
   selecting the one or more channels with weights above the threshold.

9. The method of claim 8, wherein the threshold is determined based on factors comprising a degree of uncertainty, available bandwidth, or combinations thereof.

10. The method of claim 1, further comprising:
    transmitting a request for channels with weights below a threshold to the transmitter vehicle based on the weights corresponding to the set of channels.

11. A method for data sharing between a receiver vehicle and a transmitter vehicle comprising:
    obtaining sensor data captured by the receiver vehicle;
    encoding sensor data into a set of structured data having a set of features and a set of channels;
    generating a channel attention map based on inter-channel relationships of the set of features;
    generating weights corresponding to channels of the channel attention map;
    selecting one or more channels among the set of channels based on the weights corresponding to the set of channels; and
    transmitting, by the receiver vehicle, a request for the selected one or more channels to the transmitter vehicle.

12. The method of claim 11, wherein selecting one or more channels among the set of channels based on the weights corresponding to the set of channels comprises:
    comparing the weights corresponding to the set of channels with a threshold; and
    selecting the one or more channels with weights below the threshold.

13. The method of claim 11, wherein generating the channel attention map is performed by a machine learning model.

14. The method of claim 13, further comprising, before generating the channel attention map, training the machine learning model to recognize subjects of interest based on a training dataset comprising a set of digital representations of subjects of interest.

15. The method of claim 11, further comprising receiving a preparatory message from the transmitter vehicle to assist in processing the selected channels.

16. The method of claim 11, further comprising:
    receiving the requested channels from the transmitter vehicle; and
    replacing channels in the set of channels with the received requested channels.

17. The method of claim 12, wherein the threshold is based on factors comprising a degree of uncertainty, available bandwidth, or combinations thereof.

18. A system for data sharing between a transmitter vehicle and a receiver vehicle comprising:
    a controller configured to:
        obtain sensor data captured by the transmitter vehicle;
        encode the sensor data into structured data having a set of features and a set of channels;
        generate a channel attention map based on inter-channel relationships of the set of features;
        generate weights corresponding to channels of the channel attention map;
        select one or more channels among the set of channels based on the weights corresponding to the set of channels; and
        transmit the selected channels from the transmitter vehicle to the receiver vehicle.

19. The system of claim 18, wherein the controller is further configured to:
    selecting another set of channels among the set of channels based on the weights corresponding to the set of channels; and
    transmitting a request for the selected another set of channels.

20. The system of claim 18, wherein generating the channel attention map is performed by a machine learning model trained to recognize subjects of interest based on a training dataset comprising a set of digital representations of subjects of interest.

* * * * *

UNITED STATES PATENT AND TRADEMARK OFFICE
CERTIFICATE OF CORRECTION

| | | |
|---|---|---|
| PATENT NO. | : 11,943,760 B2 | |
| APPLICATION NO. | : 17/382514 | |
| DATED | : March 26, 2024 | |
| INVENTOR(S) | : Rui Guo, Hongsheng Lu and Prashant Tiwari | |

It is certified that error appears in the above-identified patent and that said Letters Patent is hereby corrected as shown below:

In the Specification

In Column 8, Line(s) 23, after "compared", insert --with--.

Signed and Sealed this
Seventeenth Day of September, 2024

Katherine Kelly Vidal
*Director of the United States Patent and Trademark Office*